| (12) | United States Patent | (10) Patent No.: | US 8,075,726 B2 |
|---|---|---|---|
| | Nakaya et al. | (45) Date of Patent: | Dec. 13, 2011 |

(54) METHOD FOR PRODUCING HERMETICALLY SEALED CONTAINER FOR BEVERAGE OR FOOD

(75) Inventors: Masaki Nakaya, Tokyo (JP); Hirofumi Kan, Shizuoka (JP)

(73) Assignees: Kirin Beer Kabushiki Kaisha, Tokyo (JP); Hamamatsu Photonics K.K., Shizuoka (JP)

( * ) Notice: Subject to any disclaimer, the term of this patent is extended or adjusted under 35 U.S.C. 154(b) by 635 days.

(21) Appl. No.: 11/917,570

(22) PCT Filed: Aug. 1, 2006

(86) PCT No.: PCT/JP2006/315223
§ 371 (c)(1),
(2), (4) Date: Dec. 14, 2007

(87) PCT Pub. No.: WO2007/018077
PCT Pub. Date: Feb. 15, 2007

(65) Prior Publication Data
US 2009/0120556 A1    May 14, 2009

(30) Foreign Application Priority Data
Aug. 5, 2005   (JP) ................................. 2005-227871

(51) Int. Cl.
| B65B 7/00 | (2006.01) |
| B29C 65/00 | (2006.01) |
| B32B 37/00 | (2006.01) |
| B32B 38/04 | (2006.01) |
| B65D 39/00 | (2006.01) |
| B65D 41/00 | (2006.01) |
| B65D 43/00 | (2006.01) |
| B65D 47/00 | (2006.01) |
| B65D 51/00 | (2006.01) |
| B23K 26/00 | (2006.01) |

(52) U.S. Cl. .................... 156/272.8; 156/69; 156/275.1; 215/232; 219/121.63; 220/359.4

(58) Field of Classification Search .................... 156/69, 156/242, 254, 272.2, 272.8, 275.1, 292, 308.2, 156/308.4, 309.6; 215/200, 232; 219/121.6, 219/121.61, 121.62, 121.63, 121.64, 121.65, 219/121.66; 220/359.1, 359.2, 359.3, 359.4, 220/359.5
See application file for complete search history.

(56) References Cited

U.S. PATENT DOCUMENTS
4,197,955 A * 4/1980 Luenser ........................ 215/252
(Continued)

FOREIGN PATENT DOCUMENTS
JP       60-193836 A    10/1985
(Continued)

*Primary Examiner* — Philip Tucker
*Assistant Examiner* — Brian R Slawski
(74) *Attorney, Agent, or Firm* — Sughrue Mion, PLLC

(57) ABSTRACT

An object of the present invention is to provide a method for producing a hermetically sealed container, which method comprises conducting hermetic sealing of a container for beverage or food using a laser welding method, whereby the process speed of the sealing process can be made fast, strict control of the scanning position of laser spots is unnecessary, partial oversupply of energy does not occur easily, and there is no reduction in the welding area or welding strength per area due to the gathering of water drops.

The method for producing a hermetically sealed container for beverage or food according to the present invention is characterized in being a method for producing a hermetically sealed container for beverage or food, the method comprising a container body and a lid mounted on the mouth portion of the container body according to a laser welding method to an airtight state, wherein the method comprises a process of welding the entire intended welding site of the container body and the lid simultaneously or almost simultaneously.

9 Claims, 6 Drawing Sheets

U.S. PATENT DOCUMENTS

| | | | |
|---|---|---|---|
| 4,755,652 A | 7/1988 | La Rocca | |
| 5,326,956 A | 7/1994 | Lunney | |
| 5,676,512 A | 10/1997 | Diamond et al. | |
| 5,704,513 A | 1/1998 | Diamond et al. | |
| 5,865,337 A | 2/1999 | Diamond et al. | |
| 6,365,249 B1 | 4/2002 | Al Ghatta et al. | |
| 2005/0121137 A1* | 6/2005 | Kirkland | 156/272.8 |
| 2008/0135170 A1* | 6/2008 | He et al. | 156/272.8 |

FOREIGN PATENT DOCUMENTS

| | | | |
|---|---|---|---|
| JP | 61-289932 A | | 12/1986 |
| JP | 63-194885 A | | 8/1988 |
| JP | 04-339583 A | | 11/1992 |
| JP | 05245666 A | | 9/1993 |
| JP | 09-177974 A | | 7/1997 |
| JP | 2001-246488 A | | 9/2001 |
| JP | 2001246488 A | * | 9/2001 |
| JP | 2002-302133 A | * | 10/2002 |
| JP | 2002302133 A | * | 10/2002 |
| JP | 2003-048092 A | | 2/2003 |
| JP | 2004168033 A | | 6/2004 |
| JP | 2005153015 A | | 6/2005 |
| MX | 9800676 A | | 7/1998 |
| RU | 2183557 C2 | | 6/2002 |
| WO | 9705022 A2 | | 2/1997 |
| WO | 02/42196 A2 | | 5/2002 |
| WO | WO 02/42196 A2 | * | 5/2002 |
| WO | WO 0242196 A2 | * | 5/2002 |

* cited by examiner

FIG. 2 (a)
FIG. 2 (b)
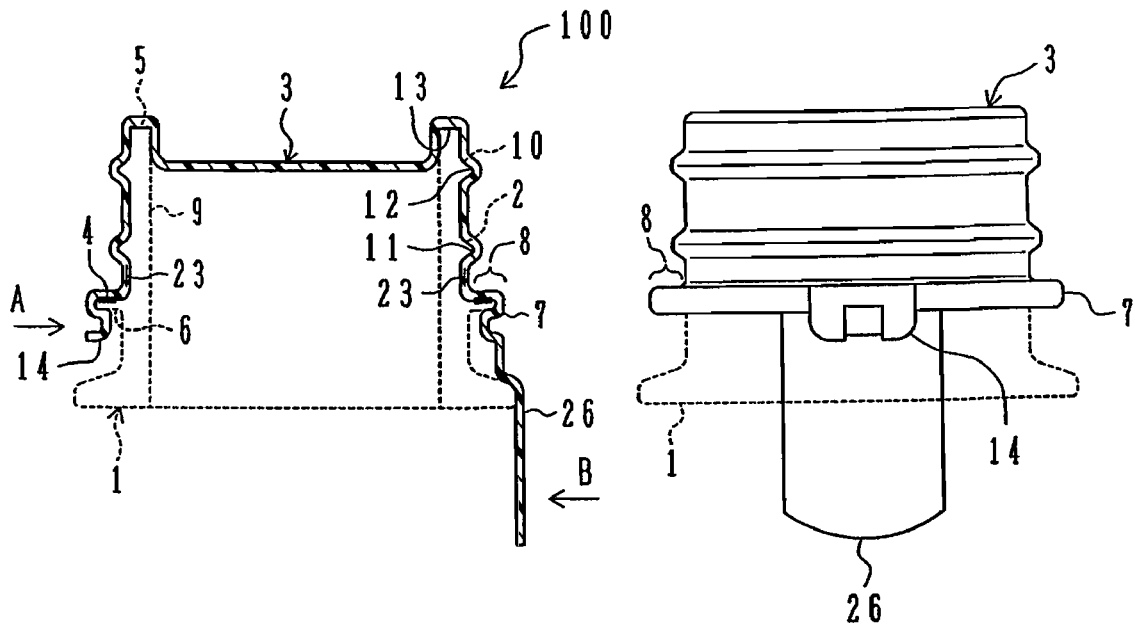
FIG. 2 (c)
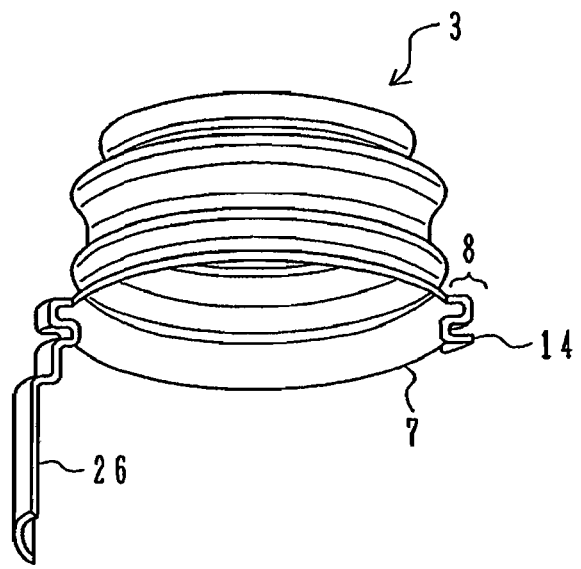

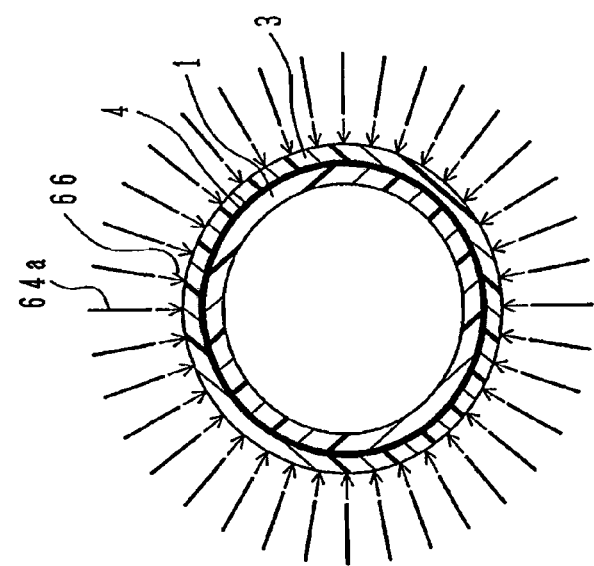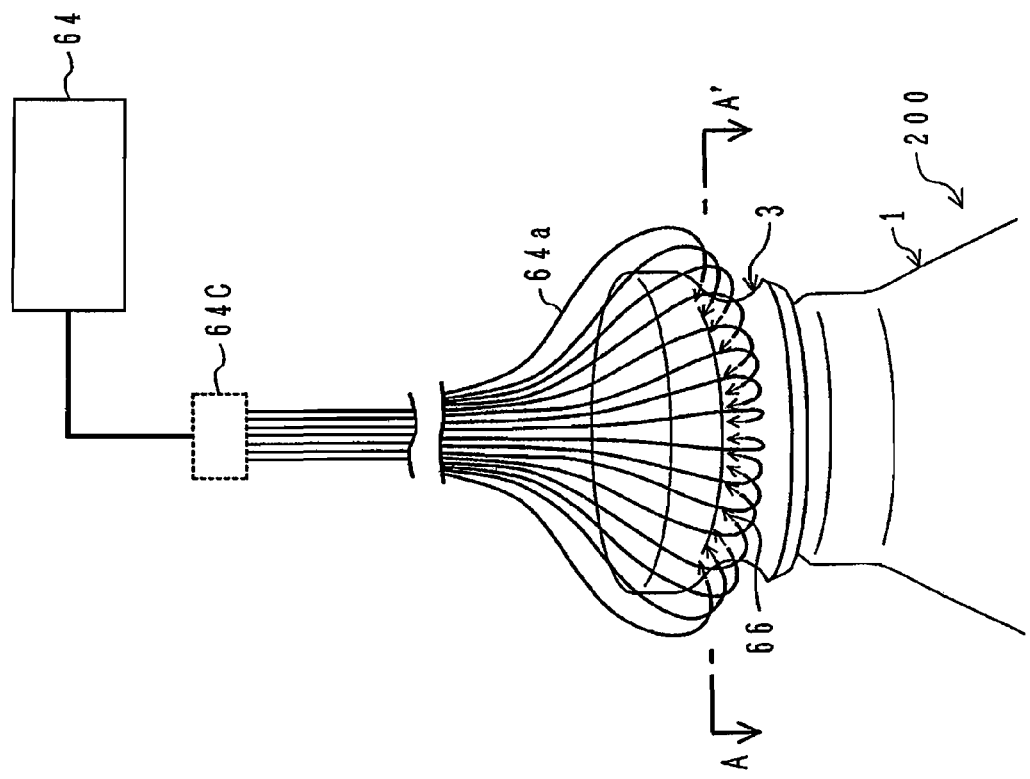

METHOD FOR PRODUCING HERMETICALLY SEALED CONTAINER FOR BEVERAGE OR FOOD

CROSS REFERENCE TO PRIOR APPLICATIONS

This is a U.S. national phase application under 35 U.S.C. §371 of International Patent Application No. PCT/JP2006/315223, filed Aug. 1, 2006, which claims the benefit of Japanese Application No. 2005-227871, filed Aug. 5, 2005, both of which are incorporated by reference herein. The International Application was published in Japanese on Feb. 15, 2007 as International Publication No. WO 2007/018077A1 under PCT Article 21(2).

TECHNICAL FIELD

The present invention relates to a technology capable of producing a highly sealable, hermetically sealed container for beverage or food at low costs, using a laser welding method.

BACKGROUND ART

As for a hermetically sealed container, for example, as for a beverage container, various containers such as bottles, cans, plastic containers and the like are known. In recent years, cans or plastic containers have been widely used from the viewpoint of convenience such as their good handlability and the like.

Among these, cans are being widely distributed for the reasons such as low container prices, high production rate, high transportation efficiency and the like. These cans are usually formed from a cylindrically shaped "container body" having a bottom, and a "lid" which seals the mouth portion of the container body. Since the method of adequately bonding these container body and lid, and hermetically sealing a content such as food, beverage or the like is limited, cans made from metals such aluminum, steel and the like are being distributed in the current market.

This bonding of the container body and the lid is carried out by seaming, in which the edge part of the container body are stacked with the edge part of the lid to form a flange structure, and mechanically superimposed. Since this seaming process is a process which utilizes the mechanical deformation of metallic members, the lid is generally formed from a member that is thicker than that of the container body, and is provided with a polymer material such as styrene-butadiene rubber, polyvinyl chloride or the like, for the purpose of content sealing. As such, since a polymer material is needed, and the lid is made thicker, the amount of the metallic material used is increased.

Thus, in order to solve this problem, technologies for performing the sealing of cans by laser welding, targeting metal cans, have been disclosed (see, for example, International Publication NO. WO 02/42196 A2; Japanese Laid-Open Patent Publication No. JP-A-63-194885; and Japanese Laid-Open Patent Publication No. JP-A-61-289932).

Another characteristic of metal cans involves the use of a high speed production line running on at a rate of several hundred cans to 2000 cans per minute. In conventional seaming apparatuses, a plurality of seaming heads are needed to cope with this production rate, and thus the apparatus size becomes relatively larger. As a result, until the lid is mounted on the container body filled with a liquid content in a seaming apparatus, it will be necessary in general for the container body to be conveyed over a distance of several meters on a conveyor, while being in a state that the container body is open to the external air. Due to the high conveying speed, as well as the transit of the container body between the seaming apparatus and the conveyor, the container body is subjected to external impacts, and as a result, gas exchange with the external air or liquid spillage occurs. Gas exchange accelerates deterioration of the liquid content through oxygen pickup. Particularly in the case of carbonated beverages, the carbon dioxide concentration of the liquid content is decreased, and the flavor is affected thereby. Furthermore, liquid spillage makes the management of the amount of product content difficult, or causes contamination of the production facilities, thus occasionally causing problems in the stable operation of the production and hygiene management.

With regard to plastic containers, it is difficult to perform a seaming process, and there are no plastic containers put in distribution, which are sealed by seaming as in the case of metal can containers for beverage. For plastic containers, the most widely distributed containers are PET (polyethylene terephthalate) bottles. With regard to the PET bottles, a method of screwing a cap on the bottle mouth portion is being used as a sealing method. However, this cap serves as a major cost-increasing factor for the whole container. Additionally, since caps are mainly made of PP (polypropylene), they pose an impediment to recycling.

Even for PET bottles, it has become general to use a high speed production line having a throughput capacity of several hundred bottles per minute. It is general to perform mounting of the lid and sealing using a capper, immediately after filling.

Furthermore, for cup-shaped containers, technologies for heat sealing a lid having a plastic resin layer and an aluminum foil layer by irradiating the lid with laser light, have also been disclosed (see, for example, Japanese Laid-Open Patent Publication No. JP-A-60-193836).

DISCLOSURE OF THE INVENTION

According to the seaming method carried out upon performing the sealing of metal cans, the use of a polymer material, the use of excess can material in the seaming portion, and the use of a lid having a larger thickness compared to the can body have become indispensable cost-increasing factors. Meanwhile, laser-welded can containers, including those of Patent Document 1, were examined for the purpose of reducing the amount of use of the materials or eliminating the need for a polymer material, in an attempt to perform laser welding in place of conventional seaming. However, because laser welding could not surpass the seaming method in terms of the production rate of welding process or economic efficiency with regard to the method of laser output or the method of superimposing the container body and the lid, laser welding has not been put to practical use.

Under such circumstances, it is conceived, in the case of performing the sealing of a container having the same shape and material as those of the conventionally used containers for beverage or food by the laser welding method, for the purpose of secure welding, that a method of moving laser spots along a line of welding points, or a method of fixing the positions of laser spots and moving the container so that welding points in a linear form are sequentially irradiated by the laser spots are performed. However, when sealing is to be attempted after filling the content as in the case of containers for beverage or food, it is possible that various spots of the container, such as the mouth portion and the like, are wet. Also, under the conditions requiring a high speed process with a sealing rate of several hundred containers or more per minute, it was found that the welding method involving laser spots is not necessarily an effective welding method.

In the case of containers made of aluminum, a purge gas is supplied so as to prevent oxidation of aluminum melting spots. This purge gas allows sufficient removal of water drops at the intended welding site. However, the range of the amount of energy supply which enables sealable welding by laser spots, is derived from the properties of the material itself, and thus is not so broad. Consequently, when the laser spots move at an appropriate moving speed which is corresponding to the process speed of the sealing process required for containers for beverage or food, extremely precise control should be achieved with respect to how to drive the laser spots along an intended welding site in a linear form. For example, in the case of moving the laser spots circle around from a starting point, and taking the starting point as the final point upon return to the starting point, if the final point is passed by for a while, there occurs an excessive supply of energy to the spots that have been passed by. In some extreme cases, even burn-through of the members may occur, thus impairing the sealability or weldability.

In the case of containers made of plastics such as polyethylene terephthalate and the like, the range of the amount of energy supply which enables sealable welding, attributable to the material, is large compared to that for containers made of aluminum, and the supplied energy may be low. In the case of welding with low energy, the amount of energy lost when evaporating the water drops attached to the intended welding site, which cannot be all removed by the purge gas, becomes large relative to the amount of energy supplied. For this reason, the effect of wetting by these water drops cannot be neglected. It is improper to solve this problem simply by increasing the energy supplied. When welding is commenced by moving the laser spots along the intended welding site, the vicinity of the welding initiation point in the intended welding site is welded prior to other points, and thus water drops gather toward those other points. As a result, at the points where water drops have gathered, reduction occurs in the welding area or welding strength per area, making stable welding difficult.

In addition to such problems as in the above, in the method of welding in a one stroke sketch-like manner using laser spots, because the laser spots must move on sequentially over the entire intended welding site in a linear form, there is a problem that the time to complete welding takes long relative to the process speed of the sealing process required for the containers for beverage or food. If the time to complete welding takes long, the size of an apparatus such as a seaming apparatus should be somewhat increased to a corresponding extent, in order to obtain a time for retaining welded containers inside the apparatus. Then, as described above, there is required a process of conveying a container body filled with a liquid content to the apparatus in a state without lid.

Thus, an object of the present invention is to provide a practical method for producing a sealed container by implementing the sealing of a container for beverage or food using a laser welding method, the method being characterized in that (1) the process speed of the sealing process can be made fast, (2) strict control of the scanning positions of laser spots is unnecessary, while partial oversupply of energy does not occur easily, (3) reduction in the welding area or welding strength per area due to the gathering of water drops, does not occur, (4) an appropriate pressure-resistant strength can be imparted to the container to achieve welding accompanied by sealability and safety, and (5) handling and safe operation of the welding apparatus and the peripheral facilities are easy.

SUMMARY OF THE INVENTION

The inventors of the present invention devotedly investigated to solve the problems in the method of welding in a one stroke sketch-like manner using laser spots, and found that it is effective to perform welding by irradiating the entire intended welding site with laser light simultaneously or almost simultaneously, even in the case of performing sufficient irradiation of laser light while avoiding the burn-through of aluminum containers or the like, or even in the case of achieving stable welding against the wetting of the welding points on plastic containers. Thus, the inventors completed the present invention. That is to say, the method for producing a hermetically sealed container for beverage or food according to the present invention is a method for producing a hermetically sealed container for beverage or food, in which method a container body and a lid mounted on the mouth portion of the container body are welded to an airtight state, and is characterized by having a process of welding the entire intended welding site of the container body and the lid simultaneously or almost simultaneously.

The method for producing a hermetically sealed container for beverage or food according to the present invention includes irradiating a region containing the entire intended welding site with laser light. It is to define a region for laser light irradiation so as to simultaneously weld the entire intended welding site.

The method for producing a hermetically sealed container for beverage or food according to the present invention includes that the configuration of laser light irradiation is annular or centripetal. Although the contacting parts between the container body and the lid become the points of imparting airtightness, these points are often in an annular or cylindrical configuration. Thus, by tailoring the configuration of laser light irradiation to the configuration of the contacting parts between the container body and the lid, the supply amount of the energy supplied is made sufficient to meet the requirement, while it is possible to avoid irradiating places other than the intended welding site with laser light, thus preventing material degradation.

The method for producing a hermetically sealed container for beverage or food according to the present invention includes that the configuration of laser light irradiation is in the form of a region having a broader width than the minimum width among the widths in various directions of the intended welding site described above. Even when the configuration of laser light irradiation is in the form of a region having a width required at the minimum, the entire intended welding site can be simultaneously welded.

In the method for producing a hermetically sealed container for beverage or food according to the present invention, it is preferable that the container for beverage or food having the container body mounted with the lid is irradiated with laser light while being revolved and/or conveyed. Here, it is preferable that conveyance of the container is achieved by continuous conveyance at a constant rate. When the conveyance of the container is carried out by a conveyor which is continuously operated at a constant rate, laser welding can be used in a high speed production line. Furthermore, when a constant rate is maintained, laser welding is made possible on the same conveyor as the conveyor for mounting lids, and thus the time taken to the mounting of the lid after filling the content in the container, can be made very short, while vibration of the liquid surface in the container can be minimized. In particular, since the laser irradiator is fixed to the conveyor, the size of the welding apparatus within the production line can be made small, and the fine adjustment as required by the respective heads of the seaming apparatus is not needed. Here, also when laser light is irradiated while the containers for beverage or food having the lid mounted on the container body are being transferred, it is preferable that the laser light is irradiated only for the time periods where the containers are in a specific range of position. The containers which have been subjected to the content filling process can be continuously led to the sealing process. At this time, by irradiating the containers with laser light only when they are within a specific range of position, unnecessary irradiation is omitted, and deterioration of the material at sites other than the intended welding site can be prevented.

The method for producing a hermetically sealed container for beverage or food according to the present invention includes that the container body and the lid are formed from a plastic resin or a metal.

In the method for producing a hermetically sealed container for beverage or food according to the present invention, the plastic resin is preferably polyethylene terephthalate. Here, it is more preferable that the energy of the laser light irradiated on the intended welding site is set to 0.5 to 2.1 J per one square millimeter. In the case of using the sealing method involving a laser welding method, since it is possible in theory that two welded objects attain the same material strength as that of a single object, there is a risk that the welding strength becomes too strong. In the case of a container for beverage or food, it is required from the viewpoint of the user's safety that the container safely breaks at a time point where the internal pressure has increased to an excess. Such excess pressure occurs when, for example, the container of a carbonated beverage is left in a sunny place. At this time, if the sealing of the container is not destroyed at an appropriate time point of pressure increase, there may occur situations dangerous to the user's body, such as that the lid flies out a significant speed upon breakage. Such safety aspect also serves as an important factor for putting the sealing method involving a laser welding method into practice. In this regard, polyethylene terephthalate is one of the resins that have been-used as a material for containers for beverage or food, and the conditions for laser light irradiation for sealing a container formed from the resin are to be defined so that the container attains an adequate welding strength.

In the method for producing a hermetically sealed container for beverage or food according to the present invention, it is preferable that the container body and the lid are formed from aluminum to have a thickness of 0.2 mm or less. Here, it is more preferable that the energy of laser light irradiated on the intended welding site is set to 17 to 26 J per one square millimeter. Aluminum is one of the metals that have been most often used as a material for containers for beverage or food, and from the viewpoint of safety as described above, the conditions for laser light irradiation for sealing a container formed from the metal are to be defined so that the container attains an adequate welding strength.

The present invention can be applied, upon implementing the sealing of a container for beverage or food using a laser welding method, to make the process speed of the sealing process fast. Furthermore, strict control of the scanning positions for laser spots is unnecessary, and partial oversupply of energy does not occur easily. In addition, there occurs no reduction in the welding area or welding strength per area due to the gathering of water drops. Also, an appropriate pressure-resistant strength is conferred to the container, so that welding accompanied by sealability and safety can be achieved. Handling and stable operation of the welding apparatus is also facilitated.

BRIEF DESCRIPTION OF THE DRAWINGS

FIG. 2 is a schematic diagram showing one mode of the hermetically sealed container, while (a) is a schematic diagram of the vertical cross-section of the vicinity of a mouth portion when the lid is mounted on a container body, (b) is an outline of the external appearance viewed from the direction of A, and (c) is a perspective outline of the lid viewed from the direction of B.

FIG. 5 shows the figure of irradiating with laser light the external wall part of the lid of a closely attaching part 4 which is an intended welding site of a hermetically sealed container 200; (a) is a perspective view, and (b) is a cross-sectional view across A-A'.

DETAILED DESCRIPTION OF THE INVENTION

Hereinafter, the present invention will be described in detail by way of embodiments, but the present invention is not to be construed to be limited by these descriptions. The method for producing a hermetically sealed container according to the present embodiments will be described with reference to FIG. 1 to FIG. 6. In addition, the same numeral were assigned for the same member or the same site.

The method for producing a hermetically sealed container for beverage or food according to the present embodiments involves producing a hermetically sealed container for beverage or food which has been airtightly sealed by welding a container body and a lid mounted on the mouth portion of the container body, by using welding method wherein the entire intended welding site of the container body and the lid are simultaneously or almost simultaneously welded.

Figure 1:
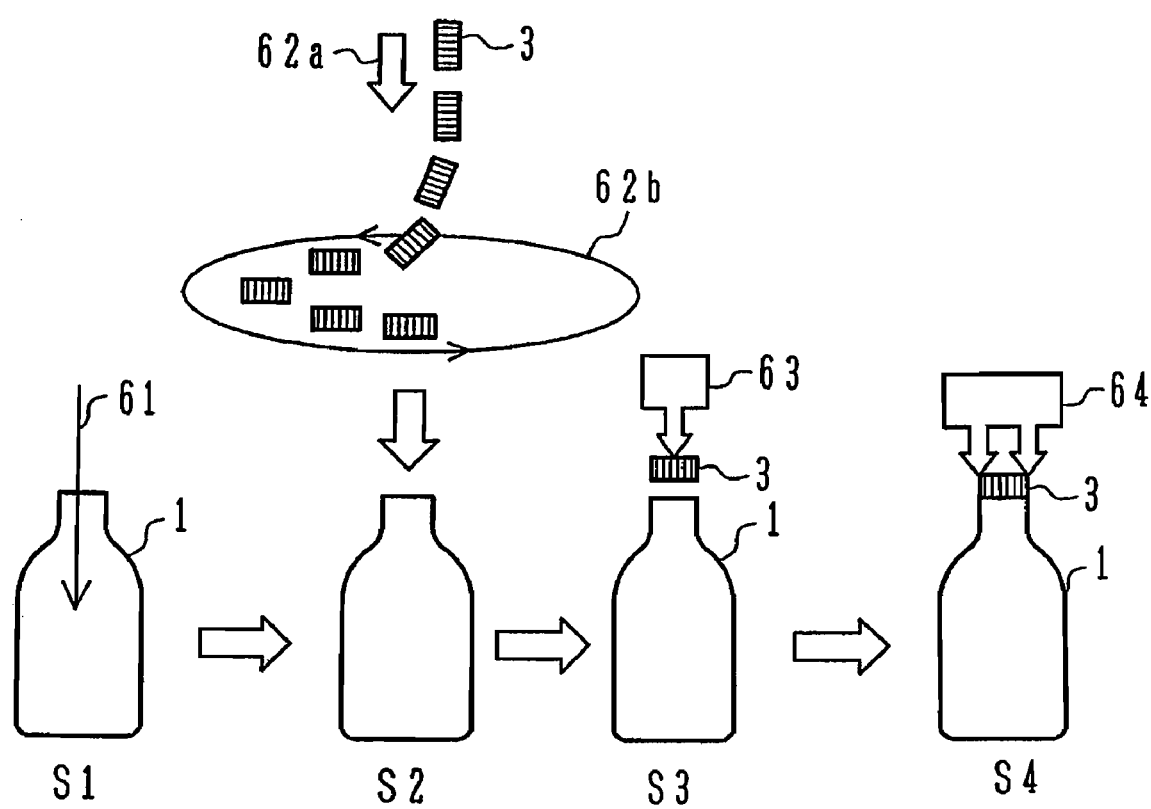
FIG. 1 shows a process flow diagram showing one mode of the method of producing a hermetically sealed container according to the present embodiment.

In order to obtain a container having beverage or food hermetically sealed, at least the following processes will be performed. FIG. 1 shows a process flow diagram showing one mode of the method for producing a hermetically sealed container according to the present embodiment. The first is a filling process S1 for filling a content 61 through the mouth portion of a container body 1. The next is a lid supplying process S2 for supplying a lid 3 to the container body 1 so as to cover the mouth portion. The next is a lid mounting process S3 for mounting the lid 3 so as to cover the mouth portion. The next is a sealing process S4 for hermetically sealing the container by welding the lid 3 to the container body 1. In the method for producing a hermetically sealed container for beverage or food according to the present embodiment, the entire intended welding site is simultaneously or almost simultaneously welded in the sealing process S4. In addition, a washing process for washing the inside of the container body or the lid may be provided before the filling process. Furthermore, a labeling process for attaching a label on the container which has passed through the sealing process may also be provided.

In the filling process S1, for example, empty container bodies 1 are placed on a turntable (not shown), and a content 61 is filled while the container bodies make a circuit of the turntable. The content 61 is exemplified by a liquid or a solid-liquid mixture such as beverage, or food. The speed may vary depending on the capacity of the container, but for example, it is from 500 to 2000 containers/minute, in the case of beverage.

In the lid supplying process S2, the container body 1 filled with the content 61 in the filling process S1 is conveyed to the place of a lid supplying means 62b by a conveying means (not shown) such as a conveyor or the like. The lid supplying means 62b receives the lid 3 conveyed by the lid conveying means 62a. The lid supplying means 62b supplies one lid 3 to the mouth portion of one container body 1. At this time, if the content 61 has been foamed, defoaming is conducted, and carbon dioxide purge or nitrogen gas purge is performed.

In the lid mounting process S3, the lid 3 is placed on a specific position of the container body 1 by a lid placing means 63. Here, it is preferable that the lid 3 is fixed to the container body 1 such that the lid closely attaches thereto, lest the lid 3 is laid askew or falls down before the laser light irradiation. In addition, the lid supplying process S2 and the lid mounting process S3 may be performed almost simultaneously.

To fix the lid to the container body such that the lid closely attaches to the container body, can be realized by devising the mouth portion of the container body and the structure of the lid. For example, there is used a container as shown in FIG. 2, that is, a container using a lid formed from a plastic material, which lid allows a strain to occur in itself when closing the mouth portion, thereby generating a part that is closely attaching to the container body under pressure caused by the stress to relieve the strain, and the closely attaching part becoming a sealed site. Here, the closely attaching part is always contacted under pressure, and serves as the intended welding site. The constitution described above causes no spillage of the content, and also can allow the content or any foreign material such as hanging water to be excluded from the closely attaching surface, which is the closely attaching part. Therefore, upon welding the closely attaching part, since there is no foreign material on the closely attaching surface, any phenomenon adversely affecting the welding, such as evaporation of a foreign material or deprivation of the heat generated by laser light irradiation, hardly occurs.

The container shown in FIG. 2 will be illustrated in detail. FIG. 2 shows a schematic diagram showing one mode of the hermetically sealed container. (a) is a schematic diagram of the vertical cross-section of the vicinity of a mouth portion upon mounting the lid to a container body, (b) is an outline of the external appearance viewed from the direction of A, and (c) is a perspective outlines of the lid viewed from the direction of B. In the hermetically sealed container 100, an annular rib 6 parallel to the edge 5 of a mouth portion 9 is provided on the external wall of the mouth portion 9 of the container body 1; an annular ring 8 forming a closely attaching part 4 together with the rib 6 is provided on the edge 7 of a lid 3; an annular protrusion 2 is provided on the external wall of the mouth portion 9 to the side of the edge 5 of the mouth portion rather than the rib 6; and an annular concavity 11 is provided on the internal wall of the lid 3, at a position where the spacing between the annular concavity and the ring 8 provided on the edge 7 of the lid 3 is slightly longer than the spacing between the annular protrusion 2 and the rib 6 provided at the mouth portion 9. Furthermore, the closely attaching part 4 of the rib 6 and the ring 8 becomes the intended welding site.

In the hermetically sealed container 100, the internal diameter of the lid 3 is designed such that the lid tightens the side wall of the mouth portion 9 quite firmly from the periphery upon mounting. Here, the spacing between the annular concavity 11 and the ring 8 is formed to be slightly longer than the spacing between the annular protrusion 2 and the rib 6 provided on the mouth portion 9. Thus, in the part of the lid 3 sandwiched between the annular concavity 11 and the ring 8, the suppressive force of the lid 3 causes a strain in the vertical direction as viewed in FIG. 2(a), thereby causing a compression stress. Since the lid 3 is formed from a plastic material, in order to relieve the strain from this compression, a force pushing away the ring 8 downward, that is, a force 23 pressing the rib 6, is generated. Thereby, the closely attaching part 4 comes to a state under pressure.

Although the lid 3 is formed from a plastic material, specifically it is formed from a plastic resin, a metal or a composite material thereof. The metal is, for example, aluminum, iron, or an alloy containing these as the main components. The plastic resin is, for example, a polyethylene terephthalate resin (PET), a glycol-modified polyethylene terephthalate resin (PETG), a polybutylene terephthalate resin, a polyethylene naphthalate resin, a polyethylene resin, a polypropylene resin (PP), a cycloolefin-copolymer resin (COC, cyclic olefin copolymerization), an ionomer resin, a poly-4-methylpentene-1 resin, a polymethyl methacrylate resin, a polystyrene resin, an ethylene-vinyl alcohol copolymerization resin, an acrylonitrile resin, a polyvinyl chloride resin, a polyvinylidene chloride resin, a polyamide resin, a polyamideimide resin, a polyacetal resin, a polycarbonate resin, a polysulfone resin, or a tetrafluoroethylene resin, an acrylonitrile-styrene resin, an acrylonitrile-butadiene-styrene resin. Among these, PET and aluminum are particularly preferred. PET and aluminum have been used as materials of containers for beverage/food. In the case of a transparent resin such as PET or the like, since the transparent resin has no absorptiveness for laser light when fused by a laser welding method, the vicinity of the closely attaching surface can be directly heated by providing the closely attaching surface of the closely attaching part with coloration having absorptiveness for laser light. Also in the case of aluminum, the vicinity of the closely attaching surface can be efficiently heated by providing the rear surface of the closely attaching surface of the closely attaching part with coloration having absorptiveness for laser light. The coloration is conducted by, for example, coating or incorporating a pigment or a dye. In addition, as an example of the composite material of a plastic resin and a metal, there is a composite film prepared by laminating a plastic resin sheet and an aluminum material. This composite film includes thin films having an overall thickness of 0.05 to 0.1 μm.

The container body 1 is formed from a plastic resin, glass, ceramics, a metal or a composite material thereof. The shape is preferably a bottle shape. Furthermore, since sealing of the container is conducted by welding according to a laser welding method, it is not necessary to make the lid thicker compared to the container body, and thus the amount of use of materials can be reduced. When the container body 1 and the lid 3 are formed from a plastic resin, it is possible to bond these with less energy than that needed when they are formed from a metal.

In the hermetically sealed container 100, a second annular protrusion 10 is further provided on the external wall of the mouth portion 9 at a position upper to the protrusion 2, and a second concavity 12 is provided on the internal wall of the lid 3. Here, the lid 3 is formed such that the spacing between the internal wall part 13 of the lid 3 in contact with the edge 5, and the second concavity 12 is slightly shorter than the spacing between the edge 5 and the second protrusion 10. Thereby, a contact surface is formed between the edge 5 and the internal wall part 13, and this contact surface comes to be always in a state under pressure. Accordingly, any foreign material is excluded also from this contact surface, and any adverse effect by such foreign material is eliminated. Thus, in the case of welding the contact surface as well, welding is facilitated. Furthermore, since welding is performed at two sites, the adhesive strength between the container body 1 and the lid 3 is enhanced.

Furthermore, in the hermetically sealed container 100, a tab 26 is provided to improve the openability of the lid 3. Also, a hooking part 14 is provided against the rib 6 so that the lid 3 does not fly out due to an internal pressure exerted on the container. Even if the lid 3 were opened carelessly, flying out the lid 3 would be prevented by the hooking part 14.

Figure 3:
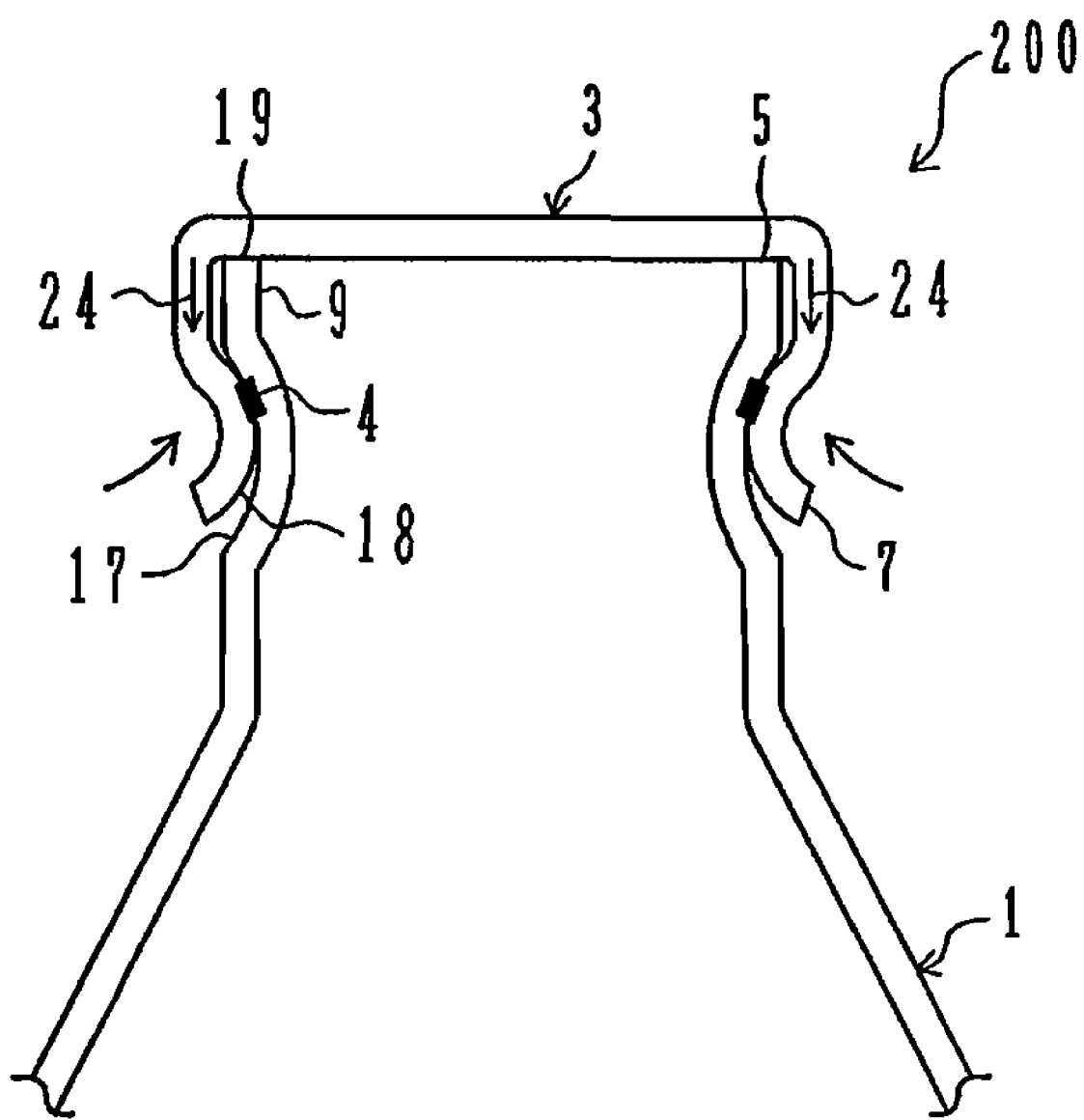
FIG. 3 shows a schematic diagram of the vertical cross-section of the vicinity of a mouth portion when the lid is mounted on a container body for another mode of the hermetically sealed container.

Moreover, in the method for producing a hermetically sealed container according to the present embodiment, as the container for use, for example, a hermetically sealed container 200 shown in FIG. 3 may also be used. A schematic diagram showing another mode of the hermetically sealed container is shown in FIG. 3. Here, there is shown an outline of the vertical cross-section of the vicinity of the mouth portion upon mounting the lid on the container body. Also for the hermetically sealed container 200 of FIG. 3, similarly to the hermetically sealed container 100, the intended welding site allows a strain to occur in itself, thereby forming a closely attaching part 4, and this closely attaching part 4 comes to be always under pressure. That is, in the hermetically sealed container 200, a contact surface 19 between the internal wall surface of the lid 3 and the edge 5 of the mouth portion 9 is provided, and an annular concavity 17 is provided in parallel to the edge 5 of the mouth portion 9 on the external wall of the mouth portion 9. Also, an annular protrusion 18 is provided on the internal wall surface of the lid 3. Moreover, an annular protrusion 18 is provided on the internal wall of the lid 3 at a site where the spacing between the annular protrusion and the contact surface 19 is slightly shorter than the spacing between the edge 5 of the mouth portion 9 and the annular concavity 17 provided on the mouth portion 9. Then, the closely attaching part 4 of the annular concavity 17 provided on the external wall of the container body 1 and the annular protrusion 18 provided on the internal wall of the lid 3 becomes the intended welding site. In the hermetically sealed container 200, the internal diameter of the lid 3 is designed such that the lid tightens the side wall of the mouth portion 9 quite firmly from the periphery upon mounting. Here, the lid 3 is formed such that the spacing between the contact surface 19 and the annular protrusion 18 provided on the lid 3 is slightly shorter than the spacing between the edge 5 of the mouth portion 9 and the annular concavity 17 provided on the mouth portion 9. Accordingly, in the part of the lid 3 sandwiched between the contact surface 19 and the annular protrusion 18, the suppressive force of the lid 3 causes a strain in the vertical direction as viewed in FIG. 3, thereby causing a tensile stress. Since the lid 3 is formed from a plastic material, in order to relieve the strain from this tension, the internal wall surface of the lid 3 exerts a force 24 compressing the edge 5, and the edge 5 is brought to immediate contact with the internal wall surface of the lid 3. On the other hand, the annular protrusion 18 of the lid 3 and the annular concavity 17 of the container body 1 are closely attached to each other, and this closely attaching part 4 comes to be in a state under pressure. The material for the lid 3 and the container body 1 is the same as the case of the first embodiment.

The methods for producing a hermetically sealed container according to embodiments are not construed to be limited to the use of containers causing a strain in themselves, as shown in FIG. 2 or FIG. 3, but the container body and the lid may be fixed to be closely attaching, by means of a lid maintaining means (not shown) which maintains the lid to be fixed to the container body.

In the sealing process S4, the entire intended welding site is welded simultaneously or almost simultaneously. In order to perform welding simultaneously or almost simultaneously, it is preferable to irradiate a region containing the entire intended welding site with laser light. In the method for producing a hermetically sealed container according to the present embodiment, there are two modes, such as one mode of welding the entire intended welding site simultaneously, and the other mode of welding the entire intended welding site almost simultaneously. The mode of welding simultaneously includes a technology of laser welding by irradiating the entire welding site which has an annular or cylindrical shape, with laser light in an annular or centripetal configuration. Also, the mode of welding almost simultaneously includes a technology of irradiating a form of a region with laser light, and laser welding a container when the container passes through the corresponding region. In order to irradiate a form of a region with laser light, for example, there is a mode in which the light beam window of a bundle of optical fibers is disposed above the conveyor to face downward, and a bundle of laser beams are irradiated onto a region where the entire intended welding site is continuously moved in and is necessarily passed through by the conveyor at a constant rate. In this case, since the configuration of laser light irradiation does not coincide with the configuration of the intended welding site, the intensity of the laser light needs to be adjusted so that the entire intended welding site is welded. However, it becomes unnecessary to make the timing of the container being conveyed by the conveyor, to precisely coincide with the irradiation timing.

First, the mode of welding the entire intended welding site simultaneously will be described. Since a hermetically sealed container for beverage or food-uses a cylindrically shaped lid having a general top side, the welding site is in general annular in shape. Thus, uniformly performing laser light irradiation in an annular or centripetal configuration becomes effective. Laser light irradiation in an annular or centripetal configuration, in the case of using a semiconductor laser, can be realized by uniformly dispersing the laser light in an annular or centripetal configuration using optical fibers. A laser generating means 64 is fixed to an intended welding site of the hermetically sealed container, and the intended welding site is irradiated with laser light in an annular or centripetal configuration for a certain time, the welding site can be formed in an annular or cylindrical shape.

Figure 4:
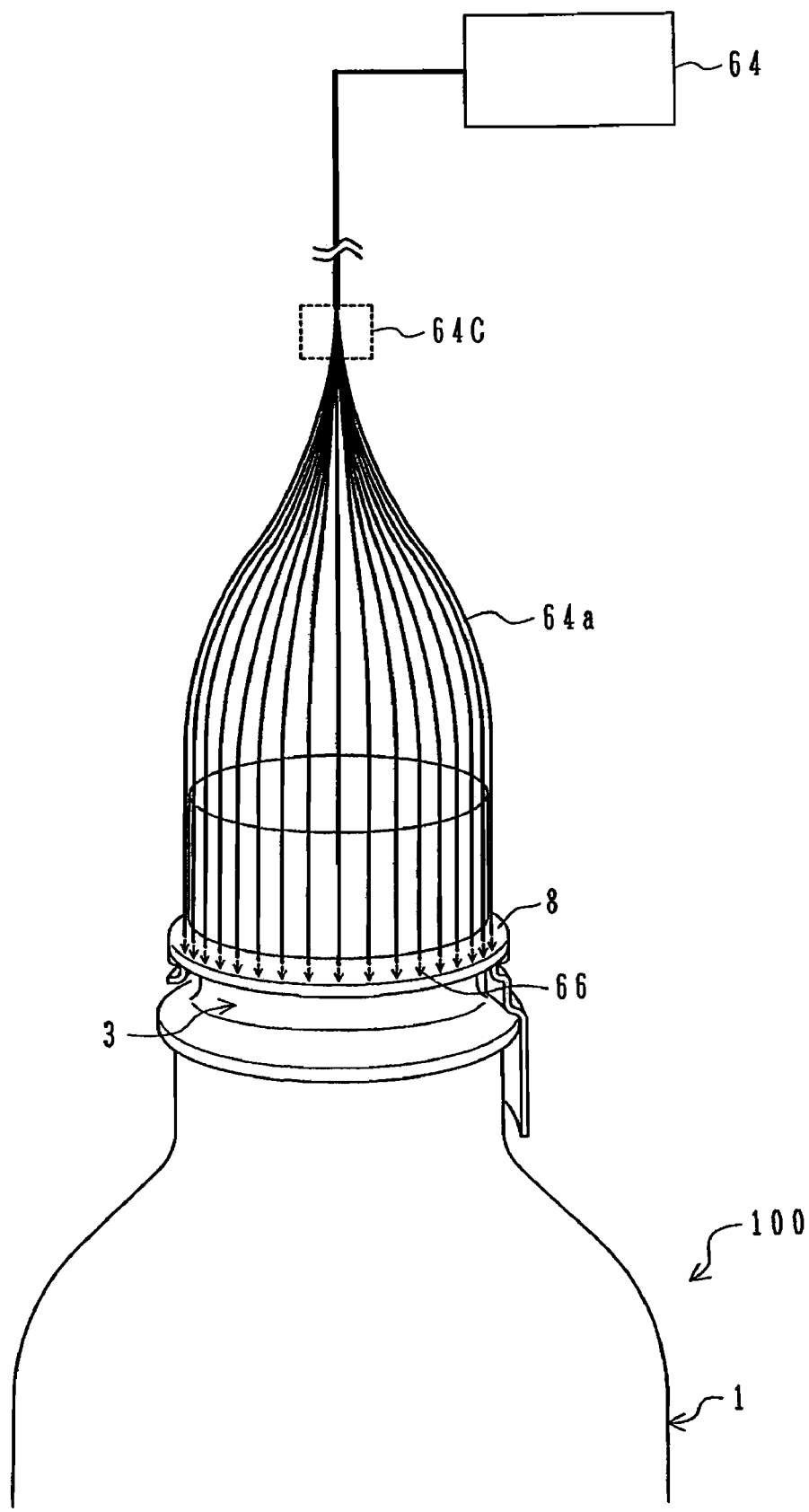
FIG. 4 shows the figure of irradiating ring 8, which is an intended welding site of a hermetically sealed container 100 with laser light.

In the hermetically sealed container 100 of FIG. 2, the closely attaching part 4 is disposed directly underneath the ring 8. Therefore, the shape of the closely attaching part 4 becomes an annular shape, when the lid 3 is viewed from the top side. FIG. 4 shows the figure of irradiating the ring 8 which is the intended welding site of the hermetically sealed container 100 of FIG. 2, with laser light 66. When the irradiation configuration of the laser light 66 is made annular by disposing optical fibers 64*a* which transmits the laser light 66 oscillated from the laser generating means 64, the entire intended welding site can be simultaneously welded without any excess or deficiency. Here, the irradiation configuration of the laser light 66 is rendered, for example, into an annular irradiation configuration having almost the same diameter as that of the ring 8 of the hermetically sealed container 100 of FIG. 2. The width of the annular irradiation configuration is preferably made smaller than the width of the ring 8. Since the boundary between the welding site and the non-welding site can be made distinctive when a laser welding method is used, the necessity for performing extra welding is reduced, and the quality of welded site is high. And also, the welding time can be shortened. Furthermore, there is no necessity of using a means for scanning laser spots, such as the one used in conjunction with a spot laser, and simplification of the laser irradiation apparatus can be promoted. In addition, the width of the annular irradiation configuration may be arranged to be greater than the width of the ring 8, but in this case, it is necessary to adjust the amount of energy supply of the laser in order not to cause any thermal damage in the vicinity of the intended welding site.

To perform laser light irradiation in an annular configuration, for example, the laser light transmitted through one optical fiber from the laser generating means 64, which serves as one laser light source, is branched to a plurality of optical fibers 64a using an optical brancher 64c such as a multibranched coupler, a waveguide element, an optical star coupler or the like, and the respective optical fibers 64a are arranged in an annular configuration having the same diameter as that of the ring 8, with the respective end-points of the optical fibers 64a being brought close to the ring 8. Thereby, the entirety of the ring 8 can be irradiated with the laser light 66 simultaneously. For example, the same can be applied to the hermetically sealed container 100, and as shown in FIG. 4, laser light is irradiated downward from the upper side, using the laser generating means 64 in which the respective optical fibers 64a are arranged in an annular configuration.

Meanwhile, when the intended welding site is provided on the circumference of the side wall of the lid 3, as in the case of the hermetically sealed container 200 shown in FIG. 3, the shape of the closely attaching part 4 becomes a cylindrical shape centered around the central axis of the lid 3, namely, the central axis of the container body 1, in the case of viewing the lid 3 from the side wall surface. FIG. 5 shows the figure of irradiating the closely attaching part 4 which is the intended welding site of the hermetically sealed container 200, on the external wall side of the lid, with the laser light 66. In FIG. 5, (a) is a perspective view, and (b) is a cross-sectional view along A-A'. When the arrangement of the optical fibers 64a which transmit the laser light oscillated from the laser generating means 64 is made in a centripetal configuration as shown in FIG. 5(b), and the irradiation configuration of the laser light 66 is made to be centripetal, the entire intended welding site having a cylindrical shape can be simultaneously welded without any excess or deficiency. For example, the side wall of the lid 3 is irradiated with the laser light 66 on the closely attaching part 4 of the hermetically sealed container 200 of FIG. 5(b), such that the irradiation is carried out from the entire circumference toward the centripetal configuration. The irradiation width of the centripetal configuration is preferably set to be smaller than the width of the closely attaching part 4 of the hermetically sealed container 200. Similarly to the case where the irradiation configuration of the laser light is arranged to be annular, the welding time can be shortened, and also the quality of the welded site is high. Further, simplification of the laser irradiation apparatus can be promoted. In addition, the irradiation width of the centripetal configuration may be set to be larger than the width of the closely attaching part 4, but in this case, it is necessary to adjust the amount of energy supply of the laser in order not to cause any thermal damage in the vicinity of the intended welding site.

To perform laser light irradiation in a centripetal configuration, for example, the laser light transmitted through one optical fiber from the laser generating means 64 is branched to a plurality of optical fibers 64a using an optical brancher 64c, and the respective optical fibers 64a are arranged in a centripetal configuration, with the respective end-points of the optical fibers 64a being brought close to the closely attaching part 4. Thereby, the entirety of the intended welding site can be irradiated with the laser light simultaneously. For example, the same can be applied to the hermetically sealed container 200, and as shown in FIG. 5(b), the laser light 66 is irradiated using the laser generating means 64 in which the respective optical fibers 64a are arranged in a centripetal configuration so that the laser light 66 can be irradiated from the entire circumference of the lid 3 toward the central axis, on the same vertical surface with respect to the central axis of the container.

Also for the case of making the laser light irradiation configuration in any of the annular or centripetal configuration, a mode is included, in which the hermetically sealed container 100 or 200 is irradiated with laser light while being conveyed by a conveyor, or while being conveyed and revolved by a conveyor. It is possible to run the processes in an assembly line-like manner, by including the respective processes ranging from the Process S1 to the Process S4, and conveying the containers by a conveyor. By revolving the containers, uniform welding may be facilitated. Subsequently, a process of irradiating the hermetically sealed container 100 or 200 with laser light for a certain time, and then driving out the container which has been sealed by welding, to the downstream processes (not shown in FIG. 1).

Figure 6:
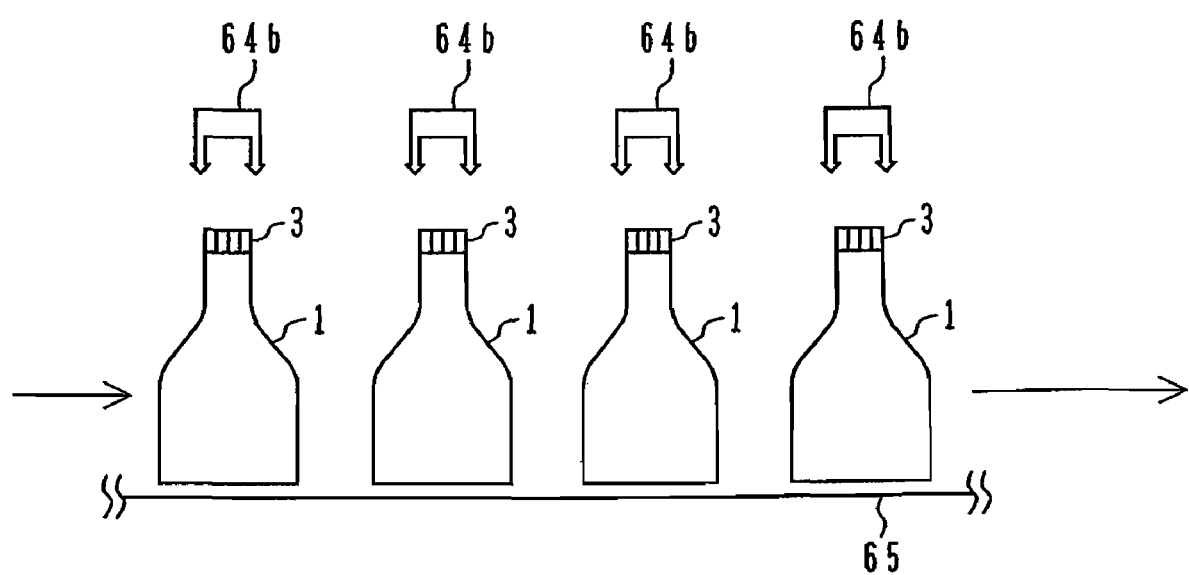
FIG. 6 shows a schematic diagram showing one mode of an embodiment of almost simultaneously welding containers streaming on the conveyor.

Next, the mode of welding the entire intended welding site almost simultaneously will be described. FIG. 6 shows a schematic diagram showing one mode of an embodiment of almost simultaneously welding containers streaming on the conveyor. As shown in FIG. 6, such mode is, for example, a mode involving a process in which a plurality of the laser generating means 64b emitting laser light in the form of a region are installed at an equal interval on the conveyor 65 which conveys the container body 1 equipped with the lid 3, the lid-attached container conveyed at the interval are irradiated with laser light for a certain time when arriving at the region of laser light irradiation, and then the container is moved to the downstream processes. Here, the process may be such that the laser light is irradiated all the time, and the intensity of irradiation is increased when the container passes by. However, it is preferable to irradiate the lid-attached container with laser light for only a time period when the lid-attached container is within a specific range of position. It is because unnecessary laser output is omitted, and irradiation of parts other than the intended welding site is reduced. Furthermore, the container may also be revolved upon welding, so as to promote uniform welding. As a hermetically sealed container, for example, the hermetically sealed container 100 shown in FIG. 2 is used. In this case, the laser light is irradiated from the upper side toward the lower side. The method of passing the container through a region in which laser light is being irradiated, necessitates that the irradiation configuration of laser light is in the form of a region having a larger width than the minimum width among the widths from various directions of the intended welding site. Also, it is necessary that the length in the direction of passing the containers through is set to a sufficient size in consideration of the intensity of the laser light and the speed of containers passing through.

To perform welding of the entire intended welding site almost simultaneously, the conveyor speed is preferably set to 50 m or greater/min, or about 500 containers or more/min. The conveyance of containers may be said to be an intermittent conveyance by which containers are stopped when laser welding the conveyor, but a conveyance of continuously moving even during the time of performing the laser welding is preferable, and in particular, a continuous conveyance at a constant speed is more preferable. Containers for beverage or food require a high-speed line, also require suppression of oxygen pickup which is largely affected, for example, by the waving of liquid surface, and require suppression of liquid spillage for the purpose of maintenance in terms of product quality, operation of apparatus and hygiene management. Thus, it is ideal to move the conveyor continuously at a high speed, to set the conveyor speed after the filling close to the moving speed of containers immediately after the filling, to eliminate a transit of containers between the conveyor and the apparatus, or a contact between containers and the apparatus, thus hermetically sealing the containers in a state that the liquid surface is maintained serene.

Also with regard to any method in the aforementioned mode of simultaneously welding or the aforementioned mode of almost simultaneously welding, in the case of a container made of aluminum, since uniform energy supply to the respective welding sites can be achieved, a problem of welding sites causing burning through or without melting is eliminated. In the case of a container made of plastics, significant migration of water drops during welding even in the case where the welding site is wet, can be eliminated.

In any of the methods involving the aforementioned mode of simultaneously welding or the aforementioned mode of almost simultaneously welding, it is preferable that the laser intensity during the laser light irradiation is watched by monitoring the laser output. It is also preferable that the position of laser light irradiation is watched by monitoring light emission or heat emission using a photosensitive sensor, or a temperature sensor such as an infrared sensor or the like. An image sensor such as CCD or the like may also be used in combination.

The laser oscillating device is exemplified by a semiconductor laser, a gas laser such as a carbon dioxide laser or the like, or a YAG laser, and is appropriately selected based on various parameters such as the material of the container body and lid to be laser-welded, the moving speed of laser irradiation, the configuration of irradiation spots, and the like. The wavelength of the laser light is, for example, 800 to 1000 nm. In the case of laser welding a plastic container or a bottle-shaped can container, a semiconductor laser is preferred.

Determination of what extent of laser output should be used during welding depends on the method of welding and the constitution of the welding site of a container. However, it was found that even if any of the above-described welding methods is used, it is possible to conduct welding accompanied by sealability by performing irradiation of a laser light with constant energy per unit area of the welding site.

In the case of a container made of metal, adjustment of the fracture site is conducted by means of the thickness of the member while withstanding pressure. However, in the case of laser welding, the change in the member thickness in the bead part can be adjusted by means of the laser output and a method of blowing a purge gas. For a container made of aluminum, beverage containers widely use a member having a thickness of 0.2 mm or less, but in order to weld with sealability within a range of obtaining appropriate welding power, as compared with the case of simply welding aluminum members, an amount of energy supply excluded from a certain narrow range of the amount of energy supply per unit area of the welding site, is not allowed from the viewpoints of sealability, and adjustment of the fracture site and internal pressure. For example, when the container body and the lid are formed from an aluminum material with a thickness of 0.2 mm or less, or when the lid is formed from an aluminum-plastic resin laminate film having a thickness of 0.2 mm or less, the irradiation energy of laser light at an intended welding site is preferably is set to 17 to 26 J per square millimeter.

In the case of a container made of plastics, since the operation is such that laser light penetrates a transparent member and is absorbed at the surface to be welded, the amount of energy supply at the welding site is virtually not affected by the thickness of the member. However, similarly to the case of a container made of aluminum, from the viewpoints of sealability and the adjustment of fracture site and pressure, as compared with the case of simply welding plastic members, an amount of energy supply per unit area of the welding site is not allowed except for a certain narrow range. If the energy supplied is low, sealing cannot be done, and if the energy is too high, the intensity of welding becomes so large that it becomes dangerous to the user, when the internal pressure of the container is elevated excessively. Thus, in the case of a PET container, the irradiation energy of laser light at an intended welding site is preferably set to 0.5 to 2.1 J per square millimeter.

In the method for producing a hermetically sealed container according to the present embodiment, it is preferable to provide a process of providing a laser light absorbing part at the closely attaching part, so as to increase the absorptance of laser light. Laser welding can be conducted with high precision along the absorbing part, even at a contour or undulation where mechanical contact would be complicated. It is because laser light results in welding mainly at a point provided with an absorbing part. This process may be carried out any time before the laser light irradiation, and may be provided before the filling process S1, between any of the filling process S1, the lid supplying process S2 or the lid mounting process S3. In addition, since this process is effective in the case of welding a material not having an absorption band for laser light, the process is not an essential process. That is, in the case where the bonding part absorbs laser light as in some colored bottles, laser welding can be performed only by laser light irradiation.

According to the method for producing a hermetically sealed container related to the present embodiment, there are advantages as follows.

(1) The time required in welding is short. It is because laser light can be irradiated onto the entire welding site simultaneously or almost simultaneously.

(2) The welding intensity is stable. It is because excess energy supply to a part of the welding site, particularly near the welding initiation point and ending point, can be prevented, and also movement of water drops during welding can be prevented when the welding site is wet.

(3) An appropriate pressure-resistant strength can be provided to the container. It is because, since stable and constant energy per unit area of welding site can be supplied, welding accompanied by sealability and safety can be obtained.

(4) Handling and stable operation of the welding apparatus is facilitated. It is because complicated movable sections such as an instrument for moving laser spot or an instrument for revolving containers are removed, and welding can be performed with only simple movable sections such as the vertical movement of the laser irradiation apparatus or conveyance of containers by a conveyor. Furthermore, it is because, compared to the case of adjusting the disposition and direction of machine components so that the light of laser spots precisely moves over the entire welding site, it is easier to observe how the laser light is irradiated over the entire welding site, and thus the light-receiving position of the container can be easily adjusted.

Also, with regard to a conventional process of seaming a metal can, it is difficult to determine as to whether a container is appropriately sealed or not at the time point when the seaming process is actually being carried out. Thus, even though the inspection results before starting the production were good, if sealing failure occurs during the seaming process, the failure is discovered only some time after the time of actual occurrence of failure. In this case, the number of containers needing to be discarded, and the time for stopping the production apparatuses, highly increases. Meanwhile, according to the method for producing a hermetically sealed container related to the present embodiment, since it can be detected as to whether the welding process has been adequately carried out or not, within an extremely short time, the process of seaming metal cans does not have the disadvantage.

EXAMPLES

To examine the resistance to pressure, a PET container having the shape of the hermetically sealed container 100 according to FIG. 1 was prepared. Optical fibers branched from a semiconductor laser of 808 nm were arranged in an annular configuration, and irradiation was conducted at 1.0 J to weld the intended welding site. Then, the pressure-resistant strength at room temperature was measured to be 12.0 atmospheres, and the heat-resistant strength at 80° C., which was assumed for hot filling, was measured to be 10.4 atmospheres. Therefore, it could be confirmed that the hermetically sealed container according to the present invention can be used as a heat-resistant container or a pressure-resistant container.

To examine the resistance to pressure, an aluminum container having a thickness of 150 μm and having the shape of the hermetically sealed container 200 according to FIG. 3 was prepared. Optical fibers branched from a semiconductor laser of 808 nm were arranged in a centripetal configuration, and irradiation was conducted at 24.0 J to weld the intended welding site. Then, the pressure-resistant strength at room temperature was measured to be 12.0 atmospheres, and the heat-resistant strength at 80° C., which was assumed for hot filling, was measured to be 10.4 atmospheres. Therefore, it could be confirmed that the hermetically sealed container according to the present invention can be used as a heat-resistant container or a pressure-resistant container.

The invention claimed is:

1. A method for producing a hermetically sealed container for beverage or food by welding a container body and a lid mounted on the mouth portion of the container body according to a laser welding method to achieve an airtight state, wherein the method comprises a process of by:

using as an intended welding site a sealed portion between an annular rib provided on an outer wall of the mouth portion of the container body of the hermetically sealed container and in parallel to a rim of the mouth portion and an annular ring provided on a rim of the lid of the hermetically sealed container for forming the sealed portion with the rib;

conveying the container body on which the lid is mounted by a conveyor;

disposing a laser irradiation apparatus above the conveyor to provide laser light, wherein said apparatus does not move at the same speed as the container body being conveyed by the conveyor;

irradiating a region where the intended welding site of the container body and the lid inevitably passes through as being moved by the conveyor with laser light that is emitted from an upper side toward a lower side and has an irradiation configuration of being in the form of a region that has a width larger than a minimum width among widths in various directions of the intended welding site, in which the form does not coincide with a configuration of the intended welding site; and irradiating a region including an entire part of the intended welding site with the laser light by conveying the container with the lid to the laser light irradiation region, so that the entire intended welding site of the container body and the lid is welded when the entire intended welding site passes through the laser light irradiation region.

2. The method for producing a hermetically sealed container for beverage or food according to claim 1, wherein the container for beverage or food having the lid mounted on the container body, is irradiated with laser light while being revolved.

3. The method for producing a hermetically sealed container for beverage or food according to claim 1, wherein the conveyance of the container is continuous conveyance at a constant rate.

4. The method for producing a hermetically sealed container for beverage or food according to claim 1, wherein when the container for beverage or food having the lid mounted on the container body is irradiated with laser light while being conveyed, the container is irradiated with laser light only for a time period when the container is in a specific range of position.

5. The method for producing a hermetically sealed container for beverage or food according to claim 1, wherein the container body and the lid are formed from a plastic resin or a metal.

6. The method for producing a hermetically sealed container for beverage or food according to claim 5, wherein the plastic resin is polyethylene terephthalate.

7. The method for producing a hermetically sealed container for beverage or food according to claim 6, wherein the energy of laser light irradiation at the intended welding site is set to 0.5 to 2.1 J per square millimeter.

8. The method for producing a hermetically sealed container for beverage or food according to claim 1, wherein the container body and the lid are formed from aluminum having a thickness of 0.2 mm or less.

9. The method for producing a hermetically sealed container for beverage or food according to claim 1, wherein the laser light is emitted from a light beam window of a bundle of optical fibers so as to form the irradiation configuration of being in the form of said region.

* * * * *